United States Patent [19]
Stingelin

[11] 3,885,944
[45] *May 27, 1975

[54] METHOD OF MAKING SHEET GLASS

[75] Inventor: Valentin Stingelin, Aire, Ge, Switzerland

[73] Assignee: Battelle Memorial Institute, Carouge/Geneve, Switzerland

[ * ] Notice: The portion of the term of this patent subsequent to July 31, 1990, has been disclaimed.

[22] Filed: May 21, 1973

[21] Appl. No.: 361,942

Related U.S. Application Data

[63] Continuation-in-part of Ser. No. 126,789, March 22, 1971, Pat. No. 3,749,563.

[30] Foreign Application Priority Data

Mar. 24, 1970  Switzerland.................... 4459/70

[52] U.S. Cl.................................. 65/99 A; 65/91
[51] Int. Cl................................... C03b 18/02
[58] Field of Search............. 65/99 A, 182 R, 182 A, 65/25 A, 199, 91, 92

[56] References Cited
UNITED STATES PATENTS

| 3,248,197 | 4/1966 | Michalik et al. | 65/99 A X |
| 3,342,573 | 9/1967 | Fredley et al. | 65/182 A |
| 3,432,283 | 3/1969 | Galey | 65/99 A |
| 3,468,650 | 9/1969 | Boaz | 65/182 R X |
| 3,665,730 | 5/1972 | Linzer | 65/182 A |
| 3,749,563 | 7/1973 | Stingelin | 65/182 R |

*Primary Examiner*—S. Leon Bashore
*Assistant Examiner*—Kenneth M. Schor
*Attorney, Agent, or Firm*—Karl F. Ross; Herbert Dubno

[57] ABSTRACT

In order to produce sheet glass of a thickness less than normal equilibrium thickness from a layer of molten glass deposited on a fluidic support, a solid structure with a plenum chamber is positioned above the support while air or other gas under pressure is discharged from the plenum chamber, through a peripheral slot, in a downwardly converging gas curtain which builds up a pressure head in the space between the support and the flat underside of the structure. This pressure head may be utilized to balance the weight of the overlying structure for floatingly maintaining same above the support in spaced relationship with the glass layer deposited thereon.

5 Claims, 5 Drawing Figures

METHOD OF MAKING SHEET GLASS

CROSS-REFERENCE TO RELATED APPLICATION

This application is a continuation-in-part of my copending application Ser. No. 126,789 filed 22 Mar. 1971, now U.S. Pat. No. 3,749,563.

FIELD OF THE INVENTION

The present invention relates to a method of making sheet glass of different thickness, including thin sheets of about 3 to 4 millimeters or less, of perfect planeness and evenness.

BACKGROUND OF THE INVENTION

There is known a method of manufacture called the float process according to which a sheet glass is produced by pouring a mass of molten glass onto a bath of a liquid of higher density, specifically molten tin, this mass being left to spread naturally over the bath and progressively reaching a so-called equilibrium thickness of about 6.3 mm under normal atmospheric pressure. The production of sheets of glass of lesser thickness can be achieved only by performing a subsequent drawing treatment on sheets initially having this equilibrium thickness; the thinner the sheet it is desired to produce, the longer and more complex the drawing treatment will be.

It has also been suggested that the bath of molten tin, acting as a support for the mass of glass pouring out of the furnace, be replaced by an air mattress or cushion. In such an event, the equilibrium thickness of the sheets of glass than can be produced is about the same as with the float process.

Attempts have also been made to reduce this fixed thickness by compressing the mass of molten glass with the aid of two counteracting air cushions between which the mass is advanced while being shaped.

In a conventional system for carrying out this method, the air under pressure used to form the cushions is discharged through a large multiplicity of modular chambers (on the order of 1500 per m$^2$), the air of each cushion being continuously exhausted through suitable outlet openings located within the immediate proximity of each modular chamber.

In another known system of this type, the two counteracting air cushions are formed with the aid of confronting plates bracketing the flow of molten glass to be shaped, each plate being provided over its entire area with a plurality of throughgoing passages that are connected to a common source of compressed air via valves which serve to regulate the pressure of the air circulating in each passage to form the air cushion of each plate. In this system, the escape of the air from the two air cushions takes place exclusively by a free flow between the plates and the glass toward the edges of the plates.

To the best of my knowledge there is at present no air-cushion system in actual operation because in practice it has proved to be virutally impossible to control same so as to produce sheets of glass that are perfectly flat.

OBJECT OF THE INVENTION

The object of the invention is to provide a method of making sheet glass which enables the thickness of the glass sheet that is produced, whether by the float process or by spreading over a gaseous support, to be set at a desired value, less than the equilibrium value, directly while the sheet is being formed.

SUMMARY OF THE INVENTION

In accordance with my present invention, sheet glass of a thickness less than the normal equilibrium thickness is produced by casting a layer of molten glass upon a predetermined surface area of a fluidic support, such as a tin bath or an air film, and positioning a solid structure with a flat underside above that surface area with clearance from the glass layer to define a limited space therebetween. A descending and downwardly converging gas (preferably air) curtain is generated around this space to build up on above-ambient pressure head therein which bears from above upon the continuously advancing glass layer.

The overlying solid structure may be floatingly maintained above the glass surface, pursuant to another feature of my invention, by the excess pressure built up in the intervening space.

BRIEF DESCRIPTION OF THE DRAWING

The above and other features of my invention will now be described in detail with reference to the accompanying drawing in which.

SPECIFIC DESCRIPTION

Figure 1:
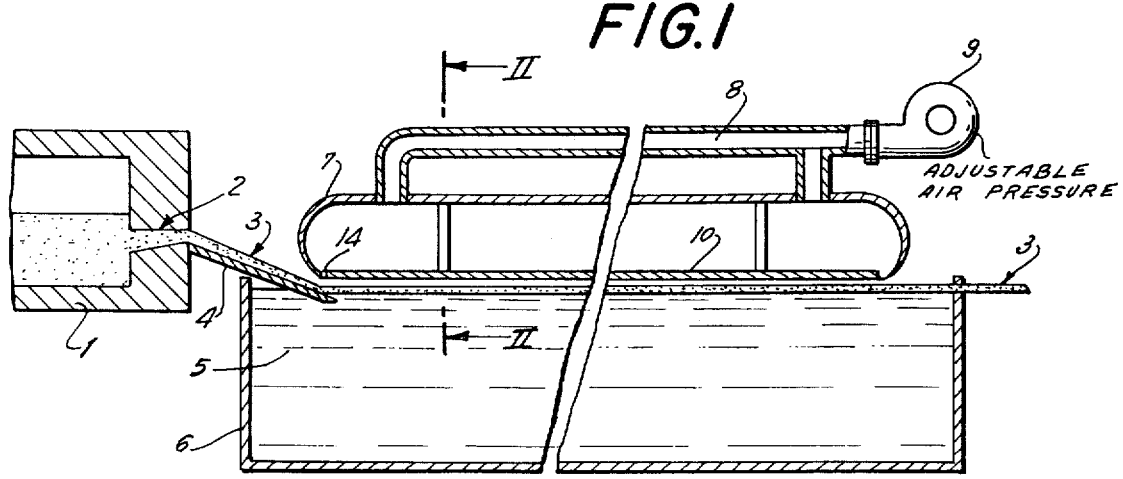
FIG. 1 is a longitudinal section of a system for producing sheet glass by the method according to this invention.

The installation illustrated in FIG. 1 comprises a glass-melting furnace 1 having an opening 2 for discharging a mass of molten glass 3 over a ramp 4 which feeds the mass to the upstream end of a bath 5 of molten tin contained in a trough 6. The walls of the trough are heated by gas or oil burners or by electric heating elements, not shown, to a relatively high temperature, on the order of 1200°C.

The metallic bath 5 serves as a fluidic support for the glass, as in the conventional process, during the forming stage. In the present system, however, the thickness of the sheet of glass that is produced can have practically any value, below the above-mentioned equilibrium value of 6.3 mm.

To this end, the installation comprises a hollow cover or hood 7 which is located above the trough 6 and which extends practically over the entire area of the tin bath 5, the interior of this hood forming a plenum chamber connected by conduits 8 to a source of gaseous fluid under pressure, e.g. air, diagrammatically represented by a centrifugal blower 9.

The gaseous fluid preferably, but not indispensably, has a temperature such that if this fluid were brought into contact with the glass that is floating on the tin bath 5, the glass would not be subjected to excessive heat stresses.

In the bottom opening of the hood 7 there is arranged, with all-around clearance, a plate 10 extending horizontally over the tin bath 5.

Figure 3:
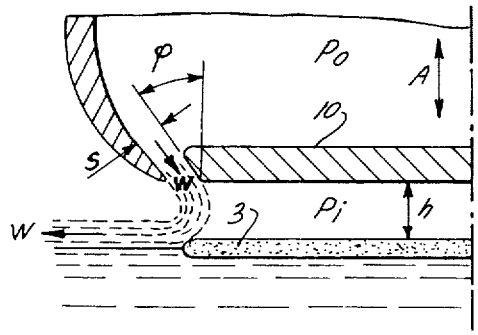
FIG. 3 is an enlarged replica of part of FIG. 2, showing a detail.

As will be observed from FIG. 3, the edge of the solid structure constituted by the plate 10 is so cut as to form a chamfer having an angle of inclination $\phi$ with reference to a vertical plane, the portion of the hood surrounding this edge extending parallel to the chamfer of the plate 10, at a distance S therefrom.

If $p_o$, $p_i$ and $p_a$ are respectively the magnitude of the pressure prevailing inside the hood 7, the magnitude of the pressure head built up between the plate 10 and the sheet of glass 3 whose thickness is to be controlled, and the magnitude of the pressure prevailing outside the hood (ambient pressure);

if $w$ is the flow speed of the gaseous fluid introduced into the space between the flat underside of the plate 10 and the sheet 3 from the source 9, as it passes through the peripheral gap 14 of width S defined by the plate 10 and the hood 7, over the entire circumference of these members;

if $\rho$ is the specific weight of this gaseous fluid;

if $h$ is the distance between the plate 10 and the sheet of glass 3;

and, finally, if it is supposed that the jet of gaseous fluid that issues from the plenum chamber at angle $\phi$ toward the tin bath 5 does not enter the space of height $h$ bounded by the plate 10 and is simply deflected outwardly along a substantially horizontal path with maintenance of a substantially constant cross-section of the jet of gas whereby the initial mean speed $w$ of the jet remains unchanged and the jet is not subjected to any pressure drop despite the deflection which it undergoes — then the internal pressure $p_i$ is greater than the external pressure $p_a$ by an amount equal to $$\Delta p = p_i - p_a = \rho w^2/2 \cdot 2 \cdot (1 + \sin \phi) \cdot S/h.$$

The internal pressure $p_o$ does not enter into this formula, except to the extent that the flow speed $w$ is a function of that pressure.

From the above relationship, it will be observed that the magnitude $\Delta p$ is least when the angle $\phi$ is equal to 0, amounting to $$\Delta p = \rho w^2/2 \cdot 2 \cdot S/h,$$

and is greatest when $\phi = 90°$, $\Delta p$ then amounting to $$\Delta p = \rho w^2/2 \cdot 4 \cdot S/h.$$

In practice, purely constructive considerations lead to the adoption of an angle $\phi$ of less than 90°, e.g. on the order of 45° to 70°. The downward conveyance of the air curtain, with a vertex angle of $2\phi$, has been indicated in FIG. 2.

It will thus be appreciated from the above that, whenever the hood 7 is supplied with gaseous fluid in the manner indicated through the gap between the hood and the plate, the pressure head of the mass of air lying between this plate and the sheet of glass to be formed, which at first is equal to the atmospheric pressure, increases by a value $\Delta p$ which is directly dependent on the square of the flow speed $w$.

Now, as soon as a sheet of molten glass is subjected on its topside to the action of a superatmospheric pressure, everything happens as if the glass were subjected to a corresponding increase in its specific weight. This causes a change in the conditions of equilibrium in the glass mass leading to a decrease in the thickness of the sheet in relation to the normal equilibrium thickness of 6.3 mm, this being the thickness that is obtained when the glass is simply left to itself on the bath of liquid tin.

With a given design of the described apparatus it is possible to determine, e.g. experimentally, the conditions under which the rate of flow and the supply pressure of the gaseous fluid fed into the plenum chamber of hood 7 are to be selected in dependence on the thickness desired for the sheets of glass being manufactured. Of course, these conditions will differ according to the temperature of the specific weight of the gaseous fluid, or according to the quality of the glass to be treated, in particular according to its viscosity and according to the variation of this viscosity with temperature.

Because of the relatively high specific weight and of the perfect cohesion of the bath of molten tin, it is possible with the described installation to produce sheets of glass of practically constant thickness and of perfect planeness. Thicknesses as low as about 1 to 2 mm can be realized by this method.

Figure 2:
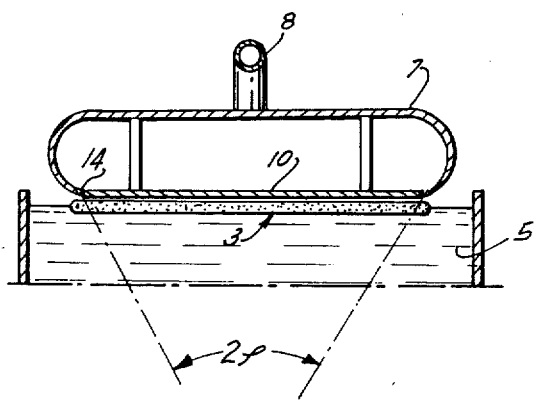
FIG. 2 is a cross-sectional view taken on the line II—II of FIG. 1.
Figure 4:
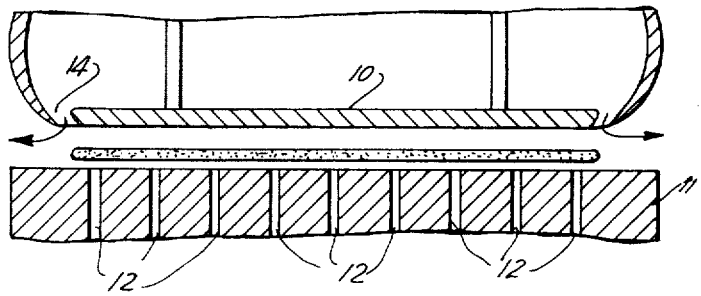
FIG. 4 is a cross-sectional view similar to FIG. 2, illustrating a somewhat different structure.

FIG. 4 illustrates a structural modification of the installation of FIGS. 1–3. The mass of glass 3 to be formed is deposited here not on a bath of molten tin but on a film of gaseous fluid, e.g. air, this film being formed on the top surface of a horizontal bed or base 11 through which extend a plurality of vertical channels 12 that are connected at their lower ends to a source of the film-forming fluid.

With this particular construction the bed 11 need not necessarily be plane. For instance, the bed could have a convex curvature, thus enabling the manufacture of glass sheets of lenticular cross-section. With a bed 11 of undulating cross-section, the resulting sheets of glass would then have one corrugated side and one flat side.

The air-curtain generator consisting of a hood with a plate disposed in a bottom opening of the latter could be replaced by separate nozzles disposed over the entire length of the edges of the operative zone of the molten tin bath (FIG. 1) or of the perforated base which emits the sheet-supporting gas (FIG. 4), these nozzles being each supplied by an individual source of gaseous fluid under pressure or by a common source. The cross-section and the inclination of these nozzles would of course have to be determined in dependence on the aforestated relationship.

Means may be provided for varying the distance of plate 10 above the fluidic support whereby the thickness of the produced sheets can be adjusted; this has been indicated schematically by arrow A in FIG. 3. The sheet thickness can also be adjusted by changing the supply pressure of the gas fed to the plenum chamber of the hood, and therefore its flow speed $w$.

Figure 5:
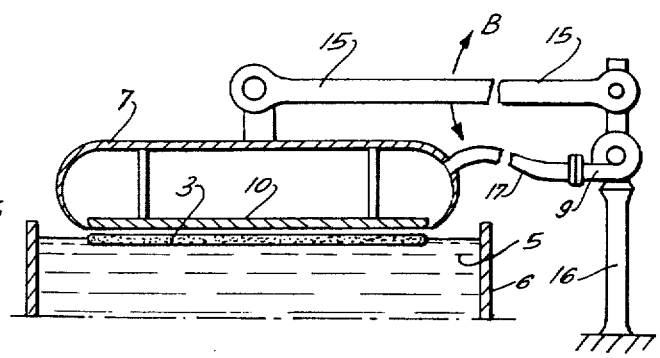
FIG. 5 is another cross-sectional view similar to FIG. 2, showing a modification.

The pressure head existing in the space below plate 10 can also be used for a floating support of the overlying structure including that plate and the hood 7. For this purpose, as illustrated in FIG. 5, that structure may be movably suspended by one or more arms 15 pivoted on a fixed mounting 16 which is also shown to carry the blower 9; in this case, the blower is connected with the plenum chamber of hood 7 through a flexible conduit 17. Such a flexible conduit will not be needed where, as shown in FIG. 1, the blower is directly mounted together with its drive motor on the floating structure.

Obviously, the floating plenum-chamber support of FIG. 5 can also be used with a perforated base of the type illustrated in FIG. 4.

With a hood-and-plate assembly 7, 10 of given weight, the pressure $p_i$ will remain constant whatever may be the pressure $p_o$ of the gaseous fluid being fed into the hood 7, it being understood that the distance $h$ between the plate 10 and the subjacent mass of glass will vary in the same sense as $p_o$ as a result of the change in flow speed $w$.

By increasing the weight of the hood, as by the addition of ballast suitably placed so that the assembly 7, 10 should retain a balanced setting, it would be possible, with a given pressure $p_o$, to decrease the distance $h$ and hence to increase the pressure $p_i$ of the gaseous fluid acting on the mass of glass being shaped, thereby bringing about a corresponding reduction in the thickness of this mass.

I claim:

1. A method of producing sheet glass of a thickness less than normal equilibrium thickness, comprising the steps of:
   casting a layer of molten glass upon a predetermined surface area of a fluidic support;
   placing a solid structure with a flat underside above said surface area with clearance from said layer to define a limited space therebetween;
   generating a descending and laterally inwardly converging peripheral gas curtain around said space above at least a portion of said layer while allowing the gas to escape freely into the surrounding atmosphere on all sides, thereby building up in said space an above-ambient dynamic pressure spreading across said portion and reducing its thickness; and
   continuously advancing said layer across said space.

2. A method as defined in claim 1 wherein said gas curtain is oriented at the level of said underside at an angle to the vertical ranging between substantially 45° and 70°.

3. A method as defined in claim 1 wherein said structure is floatingly maintained above said support by the dynamic pressure built up in said space.

4. A method as defined in claim 3 wherein said gas curtain is generated by delivering gas under pressure from an outside source to a plenum chamber in said structure and discharging the contents of said plenum chamber through a peripheral slot encompassing said space.

5. A method as defined in claim 4 wherein said gas under pressure is delivered to said plenum chamber from said source via a flexible conduit.

* * * * *